(12) United States Patent
Wajima et al.

(10) Patent No.: US 7,350,037 B2
(45) Date of Patent: Mar. 25, 2008

(54) DIGITAL SIGNAL PROCESSOR AND DIGITAL SIGNAL PROCESSING METHOD ENABLING CONCURRENT PROGRAM DOWNLOAD AND EXECUTION

(75) Inventors: Fumihiro Wajima, Tokyo (JP); Hiroki Goko, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 171 days.

(21) Appl. No.: 10/771,339

(22) Filed: Feb. 5, 2004

(65) Prior Publication Data

US 2004/0236925 A1    Nov. 25, 2004

(30) Foreign Application Priority Data

May 21, 2003    (JP)    ............... 2003-143102

(51) Int. Cl.
G06F 12/00    (2006.01)
(52) U.S. Cl. ...................... 711/154; 712/238
(58) Field of Classification Search ................ 711/119, 711/137, 140, 172, 125, 118, 170; 712/238; 717/148
See application file for complete search history.

(56) References Cited

U.S. PATENT DOCUMENTS

| | | | | |
|---|---|---|---|---|
| 3,928,857 A | * | 12/1975 | Carter et al. ................. | 711/137 |
| 3,940,741 A | * | 2/1976 | Horikoshi et al. ........... | 712/238 |
| 4,095,269 A | * | 6/1978 | Kawabe et al. .............. | 711/125 |
| 4,257,097 A | * | 3/1981 | Moran ......................... | 711/119 |
| 4,313,158 A | * | 1/1982 | Porter et al. ................. | 711/140 |
| 4,315,312 A | * | 2/1982 | Schmidt ....................... | 711/172 |
| 4,467,414 A | * | 8/1984 | Akagi et al. ................. | 711/119 |
| 6,694,511 B1 | * | 2/2004 | Yokote ........................ | 717/148 |
| 2005/0188262 A1 | * | 8/2005 | Rosenman et al. ........... | 714/25 |

FOREIGN PATENT DOCUMENTS

| | | |
|---|---|---|
| JP | 02-213968 | 8/1990 |
| JP | 2003-233509 | 8/2003 |
| JP | 2004-013506 | 1/2004 |

OTHER PUBLICATIONS

Yasuhiko Yokote, Michel Feret, and Jun-ichiro Itoh, A New Software Architecture for Evolvable Multimedia Software, presented at proceedings of ECMAST '96 Louvain, Belgium, May 28-30, 1996.*

S. Reiss, "PECAN: Program Development Sustem That Supports Multiple Views," IEEE Transactions on Software Engineering, SE-11, No. 3., Mar. 1985, IEEE, New York, N.Y., pp. 276-285.*

* cited by examiner

Primary Examiner—Pierre-Michel Bataille
(74) Attorney, Agent, or Firm—Volentine & Whitt, P.L.L.C.

(57) ABSTRACT

A signal processing device has a program memory for storing program code transferred from an external source under the control of an access control unit having an address counter. The transferred program code is executed by a computational unit having a program counter. The access control unit controls the transfer of the program code according to the values of both the address counter and the program counter, thereby enabling the computational unit to start executing the program code before the entire program has been transferred. Program initialization can therefore be completed quickly, and the program can promptly begin producing audible or visible results.

19 Claims, 6 Drawing Sheets

FIG. 3A  S11 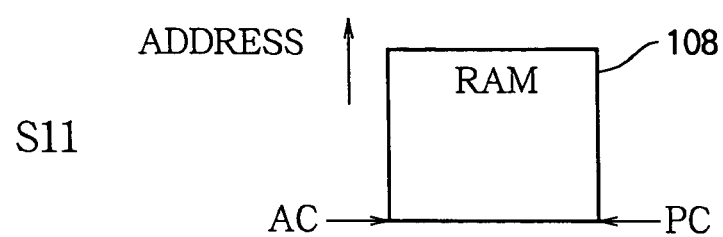
FIG. 3B  S12 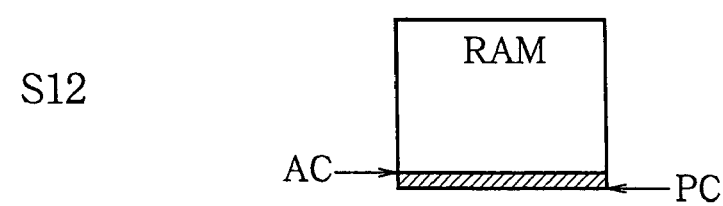
FIG. 3C  S14 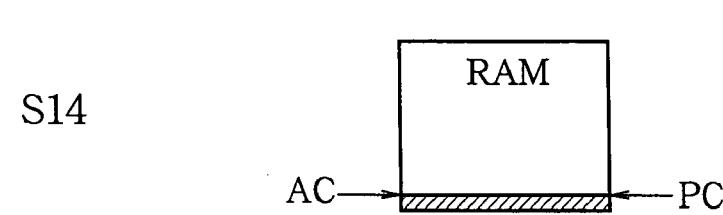
FIG. 3D  S15 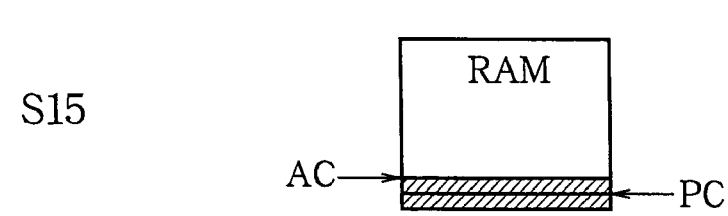
FIG. 3E  S16 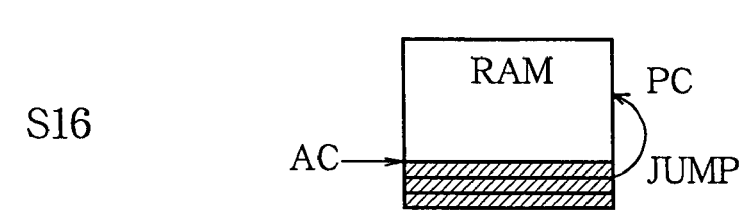
FIG. 3F  S17 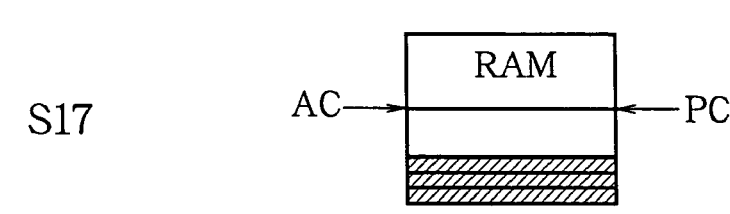
FIG. 3G  S18 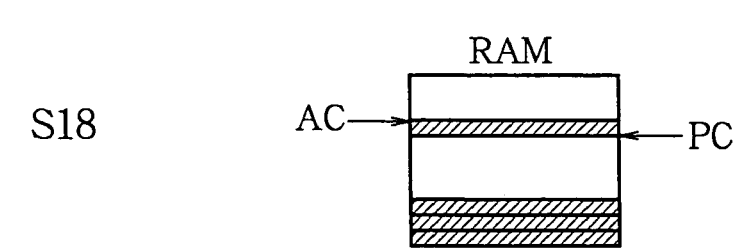

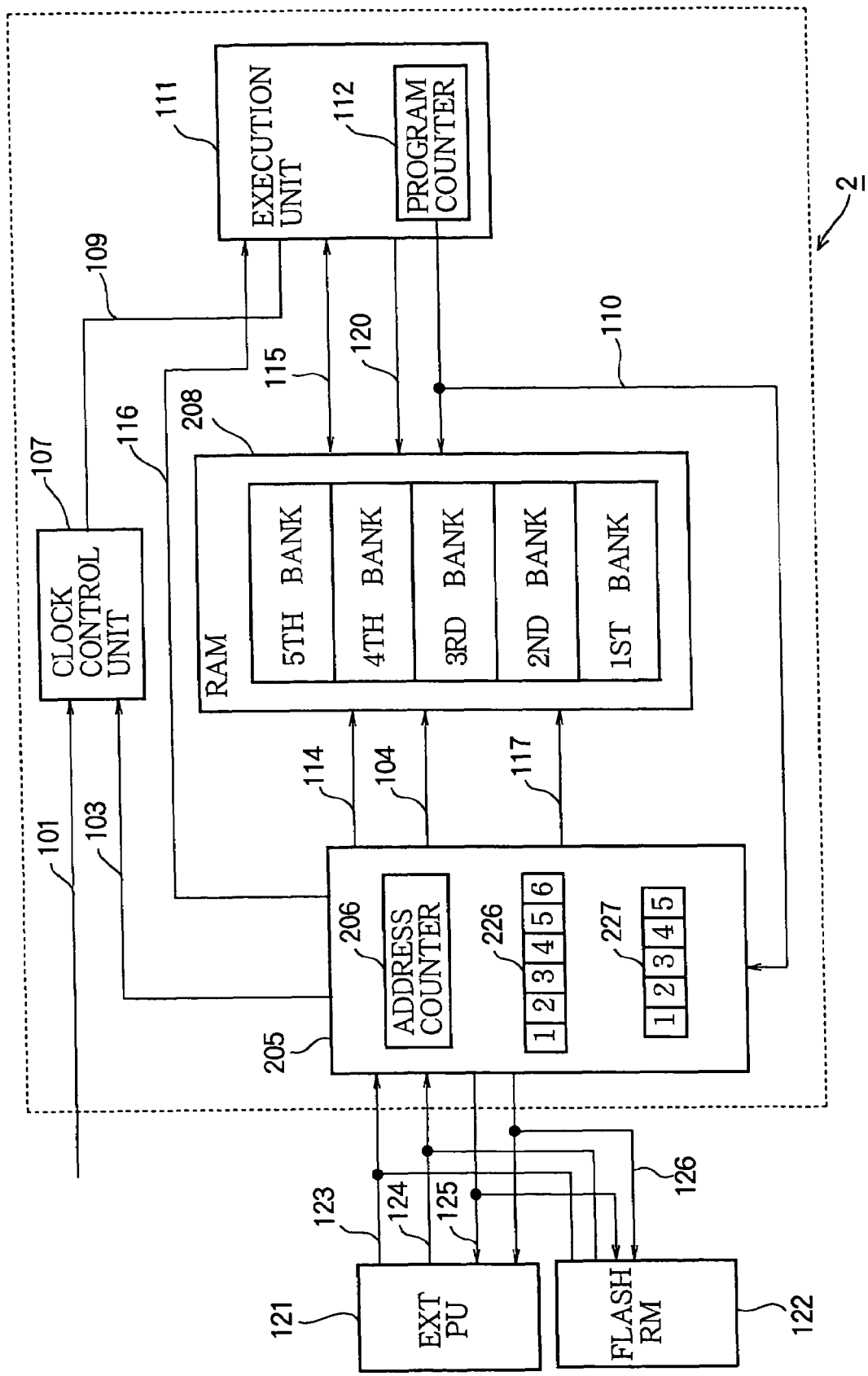

DIGITAL SIGNAL PROCESSOR AND DIGITAL SIGNAL PROCESSING METHOD ENABLING CONCURRENT PROGRAM DOWNLOAD AND EXECUTION

BACKGROUND OF THE INVENTION

1. Field of the Invention

The present invention relates to a digital signal processor having a volatile program memory.

2. Description of the Related Art

A digital signal processor (DSP) is a type of computing device that is similar to a-microprocessor but has specialized features adapted for signal processing. In particular, a DSP has a hardware multiplier that can multiply at high speed while an addition computation is performed concurrently. This enables multiply-and-accumulate operations, which are common in digital signal processing, to be carried out in real time.

A volatile program memory such as a random-access memory (RAM) enables a DSP to download and then execute programs that implement a variety of processing functions. In a mobile telephone, for example, these functions may include user interface functions related to a keypad and display, functions for reproduction of music, or functions enabling the DSP to operate as a Java virtual machine (Java is a registered trademark denoting a programming language). Some of the necessary program code may also be stored in a non-volatile program memory such as a read-only memory (ROM).

While downloading a program into a volatile program memory, a conventional DSP remains in a standby state. Execution of the program cannot begin until the entire program has been downloaded, which may take some time. Even then, execution of the program may not produce immediately audible or visible results, because in many programs an initialization sequence has to be executed before the actual signal processing can begin.

SUMMARY OF THE INVENTION

An object of the present invention is to enable a signal processing device to download a program and execute the program at the same time.

The invented signal processing device has a program memory such as a RAM for storing program code received from an external source. Program code is transferred into the program memory by an access control unit having an address counter indicating a first address in the program memory. The transferred program code is stored at the first address. The program code is executed by a computational unit having a program counter indicating a second address in the program memory. The computational unit executes the instruction stored at the second address. The access control unit controls the transfer of the program code to the program memory according to the values output by both the address counter and the program counter.

In one preferred embodiment of the invention, the access control unit transfers program code until the values output by the address counter and the program counter satisfy a predetermined condition, and the computational unit executes the instruction at the second address when the predetermined condition is satisfied.

In another preferred embodiment of the invention, the program memory is divided into banks. The access control unit selects a bank according to the values output by the address counter and the program counter, and transfers program code into the selected bank until the bank is full. In the meantime, the computational unit may execute program code in another bank. The access control unit preferably selects the bank including the second address, if program code has not yet been transferred to this bank.

In both preferred embodiments, the computational unit can start executing a program before the entire program has been transferred into the program memory. In the first preferred embodiment, program execution can start as soon as the first instruction has been transferred. In the second preferred embodiment, program execution can start as soon as the first bank has been filled. Both embodiments execute the initialization sequence of the transferred program quickly, so that the transferred program can promptly start to produce audible or visible results.

BRIEF DESCRIPTION OF THE DRAWINGS

In the attached drawings:

FIGS. 3A, 3B, 3C, 3D, 3E, 3F, and 3G illustrate the positions of the program counter and address counter values in the program RAM in FIG. 1 at various steps in FIG. 2;

FIG. 4 is a block diagram of a digital signal processing device according to a second embodiment of the invention;

DETAILED DESCRIPTION OF THE INVENTION

Figure 1:
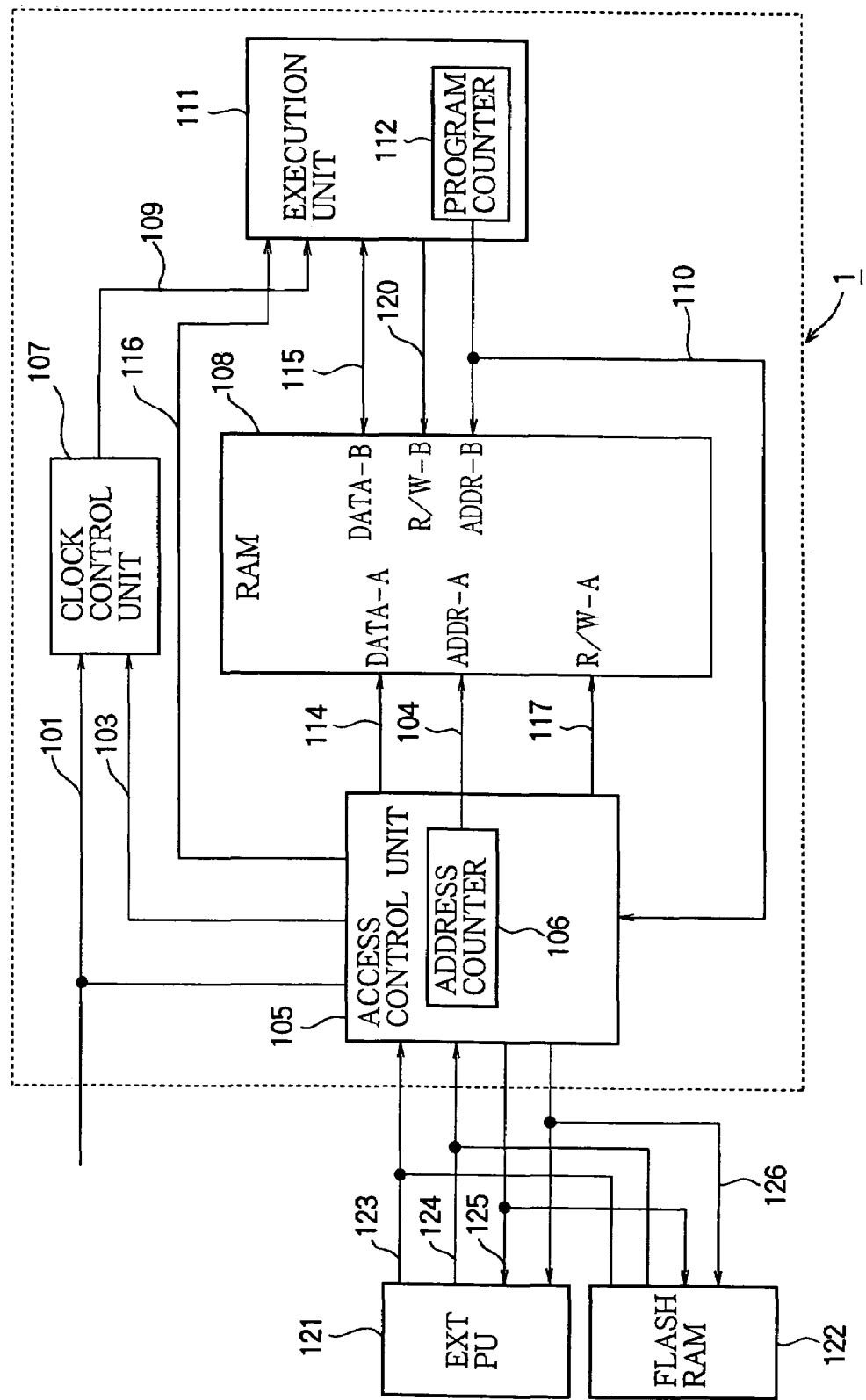
FIG. 1 is a block diagram of a digital signal processing device according to a first embodiment of the invention.

Embodiments of the invention will now be described with reference to the attached drawings, in which like elements are indicated by like reference characters. Repeated descriptions of these elements will be omitted. For simplicity, a signal line and the signal carried thereon will be identified by the same reference characters.

FIRST EMBODIMENT

A digital signal processing device according to a first embodiment will be described with reference to the block diagram in FIG. 1.

The digital signal processing device 1 in FIG. 1 includes an access control unit 105, a clock control unit 107, a dual-port RAM 108 with ports A and B, an execution unit 111, and other facilities (not shown). The dual-port RAM 108 is used as a program memory for storing downloaded program code. The execution unit ill is a computational device with the hardware multiplier and other known features found in digital signal processors. A conventional digital signal processor may be used as the execution unit 111.

The access control unit 105, which is connected to port A of the dual-port RAM 108, has an address counter 106 that outputs values indicating successive addresses in the dual-port RAM 108. In the first embodiment, a separate program instruction is stored at each address.

The access control unit 105 is connected via an external program data bus 123 and an external program address bus 124 to external devices such as an external processing unit (EXT PU) 121 and a flash RAM 122, to which it can send an external wait signal 125. Although no particular restriction is placed on the locations of the external processing unit 121 and flash RAM 122 relative to the digital signal processing device 1, the digital signal processing device 1, external processing unit 121, and flash RAM 122 will often be components of the same apparatus, such as a mobile telephone.

The address determined by the address counter 106 is transmitted via a program address bus A 104 to the dual-port RAM 108. This address or a related value can also be transmitted by an external address signal line 126 to the external processing unit 121 and flash RAM 122. Downloaded program code is written into the dual-port RAM 108 by the access control unit 105 via a program data bus A 114 and stored at the address indicated by the address counter 106. When the access control unit 105 writes program code into the dual-port RAM 108, a read/write (R/W) control signal A 117 controls the write timing.

The execution unit 111 begins to access the dual-port RAM 108 after receiving a reset signal 116 from the access control unit 105. When the execution unit 111 reads program code from the dual-port RAM 108, a program counter 112 in the execution unit 111 generates the necessary program address information. The program addresses output from the program counter 112 are input via a program data bus B 110 to the dual-port RAM 108 and also to the access control unit 105.

The execution unit 111 and dual-port RAM 108 are interconnected by a bi-directional program data bus B 115 through which program instructions and data are written and read. The read and write timings are controlled by a read/write control signal B 120.

The clock control unit 107 receives an external system clock signal 101 and a wait signal 103, which is equivalent to a stop signal, and controls the clock supply to the execution unit 111. The access control unit 105 outputs the wait signal 103 to the clock control unit 107 according to the values of the address counter 106 and program counter 112. The clock control unit 107 supplies the execution unit 111 with a DSP clock signal 109, in synchronization with which the execution unit 111 carries out arithmetic and other operations to process digital signals (not shown). When the execution unit 111 carries out these operations by using program code stored in the dual-port RAM 108, program addresses are output from the program counter 112 on the program data bus B 110.

Figure 2:
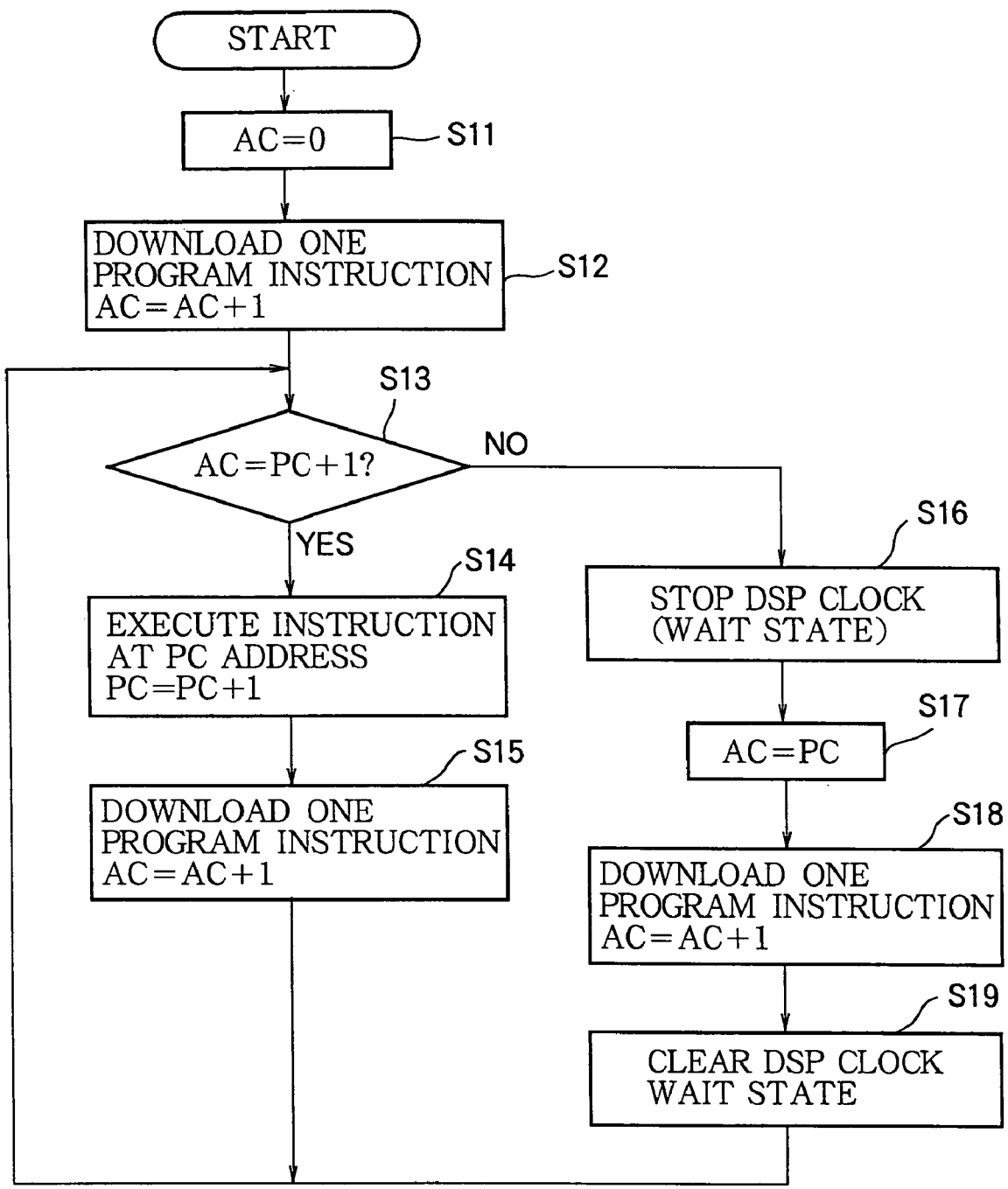
FIG. 2 is a flowchart illustrating the operation of the digital signal processing device in the first embodiment, showing program transfer and instruction execution operations.

Next, the operation of the digital signal processing device 1 in the first embodiment will be described with reference to FIGS. 1 to 3. FIG. 2 is a flowchart illustrating the operation of the digital signal processing device in the first embodiment, showing program transfer and instruction execution operations. FIGS. 3A to 3G illustrate the positions of the program counter value (PC) and address counter value (AC) in the dual-port RAM 108 in FIG. 1 in these operations. The hatched areas in FIGS. 3B to 3G indicate program instructions that have already been transferred (downloaded) to the dual-port RAM 108.

As shown in FIG. 2, the address counter is first initialized to zero (step S11). The access control unit 105 transfers a program instruction from the external processing unit 121 or flash RAM 122 to the dual-port RAM 108, stores it at the location indicated by the address counter 106, and then increments the address counter by an amount (unity) equivalent to one instruction length (step S12). Next, the address counter value (AC) is compared with a value (PC+1) greater by this amount than the program counter value (step S13).

If the result of this comparison is that AC=PC+1, then the instruction at the location indicated by the program counter 112 is executed and the program counter is incremented (step S14). Next, the access control unit 105 transfers another program instruction from the external processing unit 121 or flash RAM 122 to the dual-port RAM 108, stores it at the address indicated by the address counter 106, and then increments the address counter (step S15). After the completion of these steps, the operation returns to step S13.

If the result of the comparison performed in step S13 is that AC≠PC+1, then the access control unit 105 sends a wait signal 103 to the clock control unit 107, instructing the clock control unit 107 to stop supplying the DSP clock to the execution unit 111. The DSP clock signal 109 supplied to the execution unit 111 is held in a suspended state or wait state (step S16). The access control unit 105 sets the address counter 106 to the program counter value (step S17), then transfers the next program instruction from the external processing unit 121 or flash RAM 122 to the dual-port RAM 108, stores it at the location indicated by the address counter 106, and increments the address counter 106 (step S18). Since the DSP clock signal 109 is in the wait state, the program counter 112 is not incremented, so the condition (AC=PC+1) tested in step S13 is now satisfied. The access control unit 105 deactivates the wait signal 103, clearing the DSP clock wait state (step S19). Supply of the DSP clock signal 109 to the execution unit 111 resumes, and the operation returns through step S13 to step S14, to execute the instruction that has just been downloaded.

In the first embodiment, whenever the address counter 106 and program counter 112 satisfy a predetermined condition (AC=PC+1), the execution unit 111 executes the instruction indicated by the program counter. When the predetermined condition is not satisfied, the access control unit 105 transfers program code to the dual-port RAM 108 until the predetermined instruction is satisfied, also manipulating the address counter 106 so that it is only necessary to transfer a small number of instructions, normally only one instruction; the execution unit then executes the transferred instruction.

A typical program transfer and execution flow is illustrated in FIGS. 3A to 3G. If the instruction executed is not a jump or branch instruction, the address counter 106 and program counter 112 are both incremented by one, so the predetermined condition (AC=PC+1) is maintained after the transfer of the next program instruction, as shown in FIGS. 3A to 3D, enabling program execution to proceed from one instruction to the next without delay. If the instruction executed is a jump or branch instruction, the predetermined condition (AC=PC+1) is not maintained, as shown in FIG. 3E, but since the address counter is set to the program counter value (AC=PC) in step S17 (FIG. 3F), the predetermined condition (AC=PC+1) is restored when the next program instruction is downloaded and the address counter 106 is incremented while the DSP clock signal 109 is held in the wait state, as shown in FIG. 3G. Program execution can then proceed with a delay of only one instruction download time.

During this operation, the access control unit 105 uses the external wait signal 125 to notify the external processing unit 121 or flash RAM 122 as to whether it is ready to download the next instruction.

The access control unit 105 identifies jump and branch instructions by monitoring the PC values it receives from the execution unit 111 on program data bus B 110. When a jump or branch instruction is executed, before notifying the external processing unit 121 or flash RAM 122 that it is ready to download the next instruction, the access control unit 105 uses the external address signal 126 to send the external processing unit 121 or flash RAM 122 the address from which to obtain the next instruction, or to send the external processing unit 121 information such as the length and direction of the jump or branch, so that the external processing unit 121 can calculate the necessary address.

As described above, the digital signal processing device in the first embodiment can start executing a program as soon as it has downloaded the first program instruction into the dual-port RAM 108, and can continue to execute the program as further instructions are downloaded, without ever having to wait longer than the time required to download one instruction. The time required for program initialization can therefore be reduced.

SECOND EMBODIMENT

Next, a digital signal processing device according to a second embodiment will be described with reference to the block diagram in FIG. 4.

The digital signal processing device 2 in the second embodiment differs from the digital signal processing device 1 in the first embodiment shown in FIG. 1 in that the dual-port RAM 208 is partitioned into banks (five banks in FIG. 4) and the access control unit 205 has a RAM status register 226 and a RAM priority register 227 in addition to the address counter 206. All other parts of the second embodiment are similar to the corresponding parts in the first embodiment, so detailed descriptions will be omitted.

The dual-port RAM 208 may be divided into any number of banks of any sizes. The RAM status register 226 comprises a plurality of one-bit memory cells, each bit corresponding to one bank of the dual-port RAM 208. The bit states are defined so that the '1' state indicates that program code has already been transferred to the corresponding bank of the dual-port RAM 208 and the '0' state indicates that program code has not yet been transferred to the corresponding bank of the dual-port RAM 208. The RAM status register 226 has one more bit than the number of the banks in the dual-port RAM 208, and the state of this additional bit (the sixth bit in FIG. 4) is always '1'.

The invention is not limited to this usage of the '1' and '0' bit states. The meanings of these states may be reversed, or otherwise altered.

When the execution unit 111 tries to access a bank to which program code has not yet been downloaded, the corresponding bit in the RAM priority register 227 is set to '1'. For example, if the execution unit 111 tries to access the first bank in the dual-port RAM 208 when the first bit of the RAM status register 226 is in the '0' state, the first bit of the RAM priority register 227 is set to '1'. The execution unit 111 enters a wait state when any bit of the RAM priority register 227 is in the '1' state.

Figure 5:
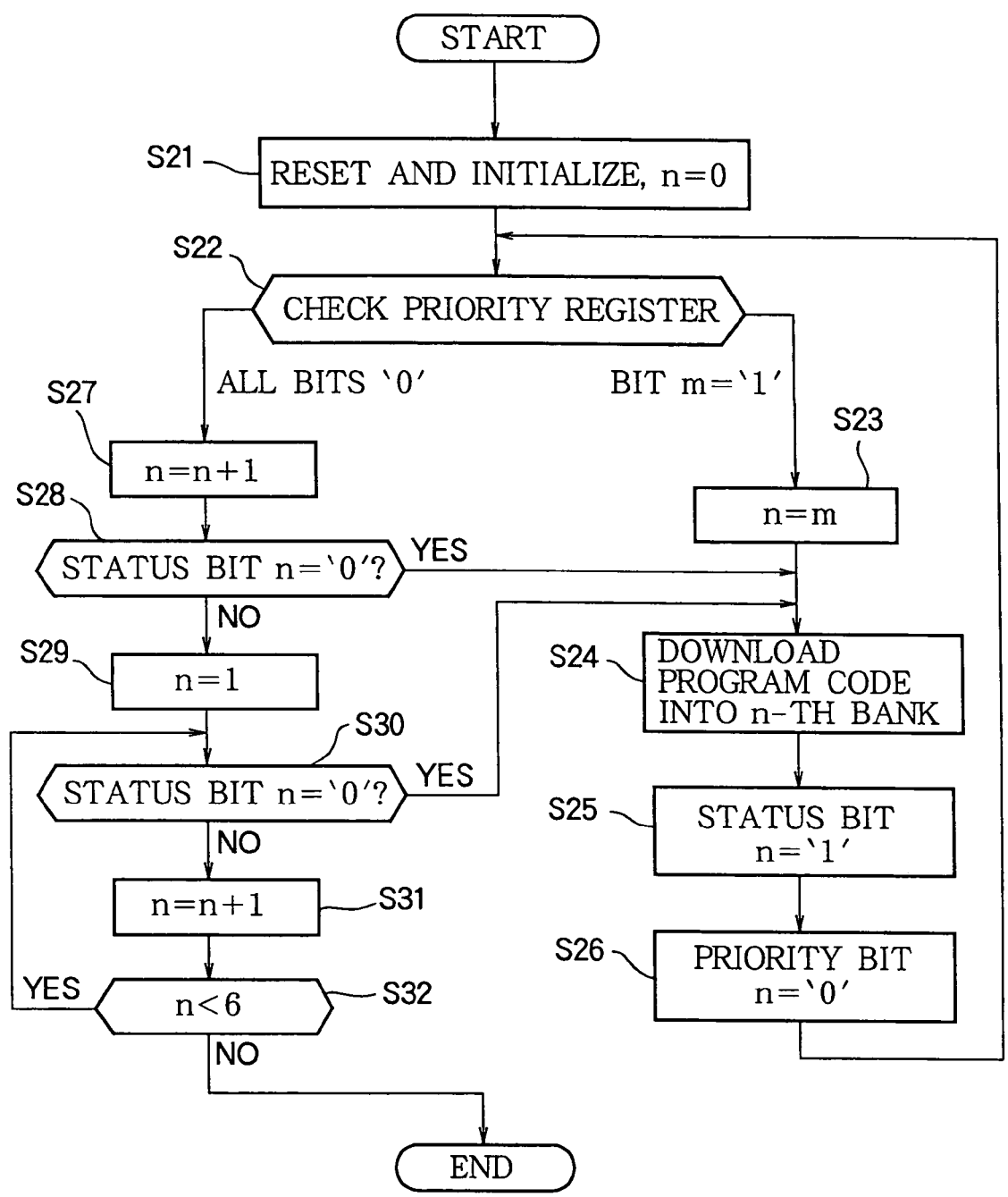
FIG. 5 is a flowchart illustrating the operation of the access control unit in the second embodiment.

Next, the operation of the access control unit 205 in FIG. 4 will be described with reference to the flowchart in FIG. 5. For brevity, the bits in the RAM status register 226 will be referred to as status bits and the bits in the RAM priority register 227 as priority bits.

To begin operation, the access control unit 205 initializes the address counter 206, RAM status register 226, and RAM priority register 227 and sends a reset signal 116 to reset the execution unit 111 (step S21). As a result, all bits in the address counter 206, RAM status register 226, and RAM priority register 227 are cleared to '0' except for the final status bit, and the program counter 112 in the execution unit 111 is initialized to zero, indicating the first address in the first bank in the dual-port RAM 208. An index variable n that will be used below is also cleared to '0'.

Next, the access control unit 205 searches for a zero status bit, assigns the number of the corresponding bank to the index variable n, and sets the address counter to a value indicating the first address in the n-th bank. As a first step, the RAM priority register 227 is checked (step S22). If any priority bit is set to '1', the access control unit 205 proceeds to step S23. If all priority bits are cleared to '0', the access control unit 205 proceeds to steps S27 to S32.

At most one priority bit can be set to '1' at a time, and when a priority bit is set to '1', the corresponding status bit must be cleared to '0'. If, for example, priority bit m is set to '1' (where m is an arbitrary integer from 1 to 5), then status bit m must be cleared to '0', so the access control unit 205 sets the index variable n equal to m (step S23).

Next, the access control unit 205 downloads program code into the n-th bank in the dual-port RAM 208, by sending the appropriate address information to the external processing unit 121 or flash RAM 122 on the external address signal line 126, and de-activating the external wait signal 125 (step S24). Program code is downloaded continuously in this step from the first address to the last address in the n-th bank. The address counter 206 is initially set to the first address in-the n-th bank, and is incremented as the program code is downloaded.

When the n-th bank has been completely loaded with program code, the access control unit 205 sets status bit n to '1' (step S25) and clears priority bit n to '0' (step S26). When priority bit n is cleared to '0', the execution unit 111 is released from the wait state and begins to execute instructions in the n-th bank. The access control unit 205 returns to step S22 and checks the RAM priority register 227 again.

If all bits in the RAM priority register 227 are cleared to '0', the access control unit 205 increments the index variable n by one (step S27).

Next, bit n in the RAM status register 226 is checked (step S28). If this bit is cleared to '0', indicating that the n-th bank is empty, the access control unit 205 proceeds to step S24 and downloads program code into the n-th bank as described above. It is not necessary to initialize the address counter this time, because the address counter already indicates the first address in the n-th bank.

If status bit n is not '0', the access control unit 205 sets the index variable n to one (step S29). Next, the process of checking bit n in the RAM status register 226 is repeated (step S30). If this bit is cleared to '0', the access control unit 205 proceeds to step S24 and downloads program code into the n-th bank.

If status bit n is not '0', the access control unit 205 increments the index variable n by one (step S31) and decides whether the incremented value of n is equal to six (step S32), indicating that the end of the RAM status register 226 has been reached. If n is less than six, the process returns to step S30 to check the next bit in the status register. If n is equal to six, then all bits in the RAM status register 226 are set to '1', indicating that program code has been downloaded into all banks in the dual-port RAM 208, so the downloading process ends.

A typical example of the overall operation of the digital signal processing device 2 in the second embodiment will be described with reference to FIGS. 6A to 6H. The numerals on the left of these drawings identify banks in the dual-port RAM 208.

Figure 6A:
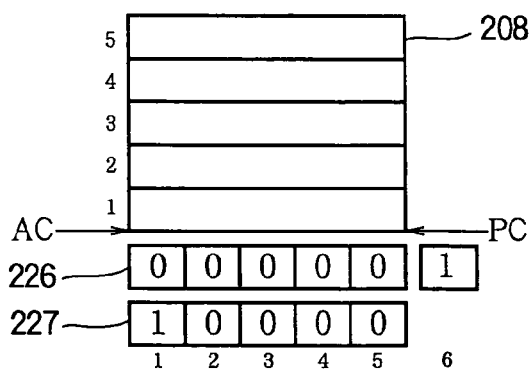
FIGS. 6A, 6B, 6C, 6D, 6E, 6F, 6G, and 6H illustrate program downloading and execution in the second embodiment.

In FIG. 6A, before downloading begins, the execution unit 111 is reset and the access control unit 205 is initialized, so the address counter (AC) and program counter (PC) both point to the first address (address zero) in the first bank in the dual-port RAM 208. When the reset state is cleared, the execution unit 111 immediately attempts to execute an instruction at this address, but since the first bit in the RAM status register 226 is cleared to '0', the execution unit 111 enters a wait state, and the first bit in the RAM priority register 227 is set to '1'.

Figure 6E:
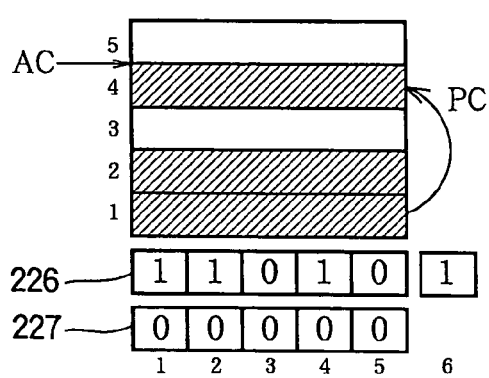
Figure 6B:
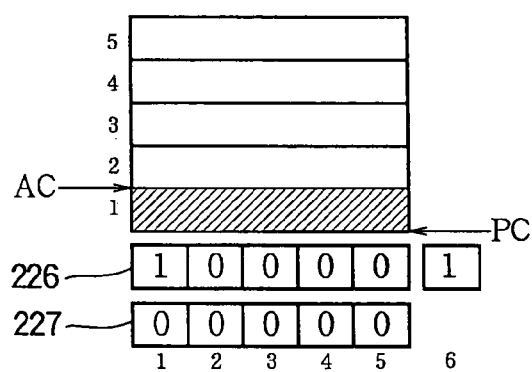

The access control unit 205 now checks the RAM priority register 227, finds that the first priority bit is set to '1', and proceeds to download program code continuously from the first address to the last address in the first bank in the dual-port RAM 108, as shown in FIG. 6B. At the end of this process, the first bit in the RAM status register 226 is set to '1' and the first bit in the RAM priority register 227 is cleared to zero. The execution unit 111 is thereby released from the wait state and begins executing the program code in the first bank.

Figure 6F:
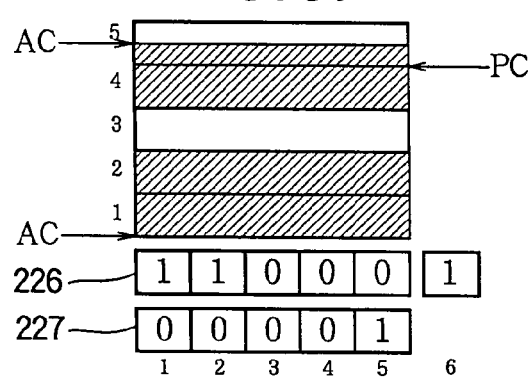
Figure 6C:
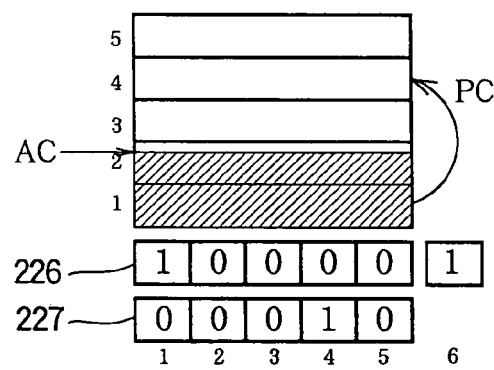

As the execution unit 111 executes the program code in the first bank, the access control unit 205 begins downloading further program code into the next bank (the second bank), as shown in FIG. 6C. Partway through this process, the execution unit 111 executes a jump instruction that sets the program counter to an address in the fourth bank. When the execution unit 111 attempts to access the fourth bank, however, the execution unit 111 is placed in a wait state because the fourth status bit is cleared to '0', and the fourth priority bit is set to '1'. The access control unit 205 continues downloading program code into the second bank.

When the access control unit 205 has finished downloading program code into the second bank, it sets the second status bit to '1', checks the RAM priority register 227, and finds that the fourth priority bit is set to '1'. The address counter 206 is accordingly set to the indicate the first address in the fourth bank, as shown in FIG. 6D.

The access control unit 205 now downloads program code into the fourth bank. At the end of this process, the fourth status bit is set to '1' and the fourth priority bit is cleared to '0', as shown in FIG. 6E. The execution unit 111 is released from the wait state and begins executing program code in the fourth bank. The access control unit 205 begins downloading program code into the next bank in the dual-port RAM 208 (the fifth bank).

While the access control unit 205 is downloading program code into the fifth bank, the execution unit 111 encounters the end of the fourth bank and attempts to access the fifth bank, as shown in FIG. 6F. Since the fifth status bit has not yet been set to '1', the execution unit 111 is placed in a wait state. The fifth bit in the priority register is set to '1'.

Figure 6G:
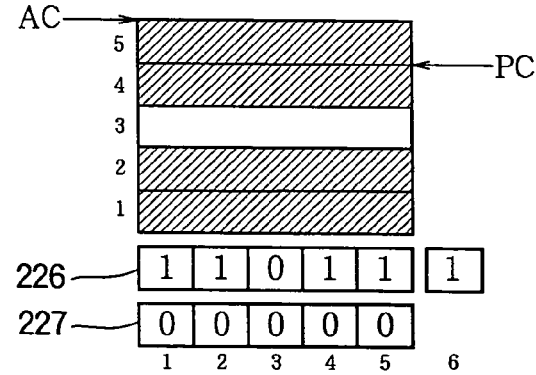
Figure 6D:
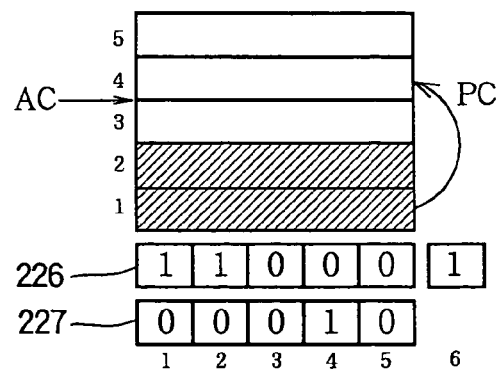

When the access control unit 205 finishes downloading program code into the fifth bank, it sets the fifth status bit to '1' and clears the fifth priority bit to '0', as shown in FIG. 6G. The execution unit 111 now begins executing the program code in the fifth bank.

Figure 6H:
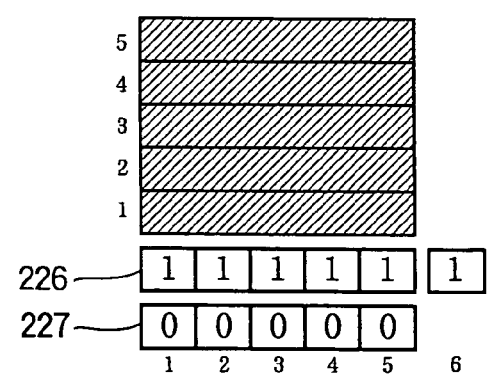

Since the fifth bank is the last bank, there is no next bank into which to download program code, so the access control unit 205 reexamines the RAM status register 226, starting from the first status bit, and finds that the third status bit is still cleared to '0'. The access control unit 205 accordingly begins downloading program code into the third bank. When this downloading process is completed, the third status bit is set to '1', as shown in FIG. 6H. Since all bits in the RAM status register 226 are now set to '1', the downloading operation ends.

As described above, the dual-port RAM 208 in the second embodiment is partitioned into banks, and the access control unit 205 downloads program code one bank at a time. When the execution unit 111 is forced to wait, the wait lasts at most for the length of time required to fill one bank with downloaded program code. Program execution can start as soon as the first bank of the dual-port RAM 208 has been filled, and in the absence of forward branch or jump instructions, program execution can continue thereafter without further waiting.

Compared with the first embodiment, the second embodiment has the advantage of not downloading an instruction to the same address more than once.

Two preferred embodiments of the invention have been described with reference to the attached drawings, but the invention is not limited to these embodiments. The following are some of the possible modifications that can be made.

Although the embodiments described above download program code into a dual-port RAM, when the program RAM has a bank structure as in the second embodiment, a single-port RAM can be used for each bank if-each bank has a selector unit that selectively interfaces the bank to either the access control unit 205 or the execution unit 111, so that the access control unit 205 can access one bank while the execution unit 111 accesses another bank.

The structure and operation of the access control unit in the above-described embodiments can be changed in various ways. For example, the condition AC=PC+1 used in the first embodiment can be replaced by AC=PC+n, where n is a predetermined positive integer greater than one. If the program instructions have variable length, for example, n may be the longest possible instruction length.

The bit-mapped priority register in the second embodiment can be replaced by a single flag bit that is set when the execution unit 111 attempts to access a bank that has not yet been loaded with program code, and the access control unit 205 can identify this bank from the program counter value.

When downloading a program that does not have enough program code to fill all banks of the dual-port RAM 208, the access control unit 205 in the second embodiment may be adapted to set all status bits to '1' when the entire program has been downloaded.

The execution unit has been described as having the functions of a digital signal processor (DSP), but other types of execution units may be employed, including microprocessors and the like.

Those skilled in the art will recognize that further variations are possible within the scope of invention, which is defined by the appended claims.

What is claimed is:

1. A signal processing device receiving program code from an external source, comprising:

a program memory for storing the program code received from the external source;

an access control unit linked to the external source by data and address signal lines and having an incrementable address counter holding a first value indicating a unique first address in the program memory, for transferring the program code from the external source to the first address in the program memory; and a computational unit having an incrementable program counter holding a second value indicating a unique second address in the program memory, for executing the program code stored at the second address in the program memory, thereby processing a digital signal; wherein the access control unit controls transfer of the program code to the program memory according to both the first value and the second value.

2. The signal processing device of claim 1, wherein the incrementable address counter increments the first value as the access control unit transfers the program code from the external source to the program memory.

3. The signal processing device of claim 2, wherein the access control unit transfers the program code sequentially from beginning to end.

4. The signal processing device of claim 2, wherein the access control unit tests a predetermined condition involving the first value and the second value and transfers the program code from the external source to the program memory until the predetermined condition is satisfied.

5. The signal processing device of claim 4, wherein the computational unit executes the program code at the second address when the predetermined condition is satisfied.

6. The signal processing device of claim 4, wherein the predetermined condition is a predetermined difference between the first value and the second value.

7. The signal processing device of claim 6, wherein the predetermined difference is equivalent to one instruction length in the program code.

8. The signal processing device of claim 4, further comprising a clock control unit supplying a clock signal to the computational unit, and temporarily halting supply of the clock signal to the computational unit on command from the access control unit.

9. The signal processing device of claim 8, wherein the access control unit commands the clock control unit to halt the supply of the clock signal when the predetermined condition is not satisfied, and commands the clock control unit to resume the supply of the clock signal when the predetermined condition is satisfied.

10. The signal processing device of claim 1, wherein:
the program memory is divided into a plurality of banks;
the access control unit selects a bank according to the first value and the second value, and transfers the program code into the selected bank until the selected bank is full; and
while the access control unit is transferring program code into one of the plurality of banks, the computational unit executes program code already transferred to another one of the plurality of banks.

11. The signal processing device of claim 10, wherein the computational unit waits until the access control unit has finished transferring the program code into the selected bank before executing the program code in the selected bank.

12. The signal processing device of claim 10, wherein the access control unit selects the bank including the second address, if program code has not yet been transferred to the bank including the second address.

13. The signal processing device of claim 10, wherein the access control unit selects the bank including the first address, if program code has already been transferred to the bank including the second address and program code has not yet been transferred to the bank including the first address.

14. The signal processing device of claim 10, wherein the access control unit includes a first register with bit values indicating whether program code has been transferred to respective banks in the program memory.

15. The signal processing device of claim 10, wherein the access control unit includes a second register indicating the bank including the second address, if program code has not yet been transferred to the bank including the second address.

16. The signal processing device of claim 10, further comprising a clock control unit supplying a clock signal to the computational unit, and temporarily halting supply of the clock signal to the computational unit on command from the access control unit.

17. The signal processing device of claim 16, wherein the access control unit commands the clock control unit to halt the supply of the clock signal while the access control unit is transferring program code into the bank including the second address, and commands the clock control unit to resume the supply of the clock signal when the transfer of the program code to the bank including the second address is completed.

18. The signal processing device of claim 1, wherein the program memory is a semiconductor random access memory.

19. The signal processing device of claim 1, wherein the computational unit comprises a digital signal processor.

* * * * *